United States Patent [19]

Landfors et al.

[11] Patent Number: 5,624,545
[45] Date of Patent: Apr. 29, 1997

[54] PRODUCTION OF POLYSULPHIDE BY ELECTROLYSIS OF WHITE LIQUOR CONTAINING SULPHIDE

[75] Inventors: Johan Landfors; Bo Håkansson, both of Sundsvall; Maria Norell, Hovås, all of Sweden

[73] Assignee: Eka Nobel Inc., Marietta, Ga.

[21] Appl. No.: 564,183

[22] PCT Filed: Jun. 1, 1994

[86] PCT No.: PCT/SE94/00526

§ 371 Date: Dec. 18, 1995

§ 102(e) Date: Dec. 18, 1995

[87] PCT Pub. No.: WO95/00701

PCT Pub. Date: Jan. 5, 1995

[30] Foreign Application Priority Data

Jun. 28, 1993 [SE] Sweden .................... 9302213

[51] Int. Cl.⁶ .................................................. C02F 1/461
[52] U.S. Cl. .................... 205/746; 205/758; 205/759; 205/770; 205/494
[58] Field of Search .................. 205/746, 758, 759, 770, 494

[56] References Cited

U.S. PATENT DOCUMENTS

| | | | |
|---|---|---|---|
| 3,249,522 | 5/1966 | Bolmer | 204/92 |
| 3,409,520 | 11/1968 | Bolmer | 204/101 |
| 4,024,229 | 5/1977 | Smith et al. | 423/562 |
| 4,519,881 | 5/1985 | Chang | 204/149 |
| 4,717,450 | 1/1988 | Shaw et al. | 162/29 |
| 4,765,873 | 8/1988 | Chang et al. | 204/101 |
| 5,061,343 | 10/1991 | Azarniouch et al. | 162/16 |
| 5,082,526 | 1/1992 | Dorris | 162/30.11 |

FOREIGN PATENT DOCUMENTS

| | | |
|---|---|---|
| 160736 | 10/1957 | Sweden . |
| 8204365 | 1/1983 | Sweden . |

OTHER PUBLICATIONS

Venemark, "Some Ideas on Polysulfide Pulping" Mar. 1964, pp. 157–166.

Malkov et al., "Electro Chemical Oxidation of Sulphidic Sulphur in an Alkaline Medium." 1984 (no month) Abstract only.

"Some Ideas on Polysulfide Pulping", E. Venemark, Svensk Papperstidning (Swedish Paper Journal), No. 5, 15 Mar. 1964.

"Electro Chemical Oxidation of Sulphidic Sulphur in an Alkaline Medium", Yu. A. Malkov et al, Chemical Abstracts 101(8):56694, Khimiya in Tekhnol. Dreves, Tsellyulozy, L., 1983, pp. 45–50, from Ref. Zh., Khim., 1984, Abstract No. 6T3006 no month provided.

"Electrochemical Production of Hydrogen and Sulfur by Low-Temperature Decomposition of Hydrogen Sulfide in an Aqueous Alkaline Solution", A.A. Anani et al, J. Electrochem. Soc., vol. 137, No. 9, Sep. 1990, pp. 2703–2709.

"Continuous Solvent Extraction of Sulfur from the Electrochemical Oxidation of a Basic Sulfide Solution in the CSTER System", Yen-Shiang Shih et al, Ind. Eng. Chem. Process Des. Dev., 1968, 25, pp. 834–836 no month provided.

(List continued on next page.)

Primary Examiner—Arun S. Phasge
Attorney, Agent, or Firm—Burns, Doane, Swecker & Mathis, L.L.P.

[57] ABSTRACT

Sulphide-containing white liquor is treated in a continuously operating electrolytic cell having separate anode and cathode compartments separated by a partially permeable barrier. White liquor is introduced into the anode compartment of the cell, and an aqueous solution of alkali metal hydroxide is introduced into the cathode compartment of the cell so that sulphide is oxidized in the anode compartment, while at the same time alkali metal cations are transported through the barrier into the cathode compartment, where water reacts to form hydroxide ions. An electrolytic cell suited for implementing the method is also disclosed.

13 Claims, 2 Drawing Sheets

OTHER PUBLICATIONS

"Electrolysis of Hydrogen Sulfide in Aqueous Alkaline Solutions", B. Dandapani et al, Intersociety Energy Conversion Engineering Conference, 1986, pp. 262–265 no month provided.

"All It Takes Is Moxy: Mead Oxidation System Generates Polysulfide Liquor", G.C. Smith et al, Paper Trade Journ., 1 May 1975, pp. 38–41.

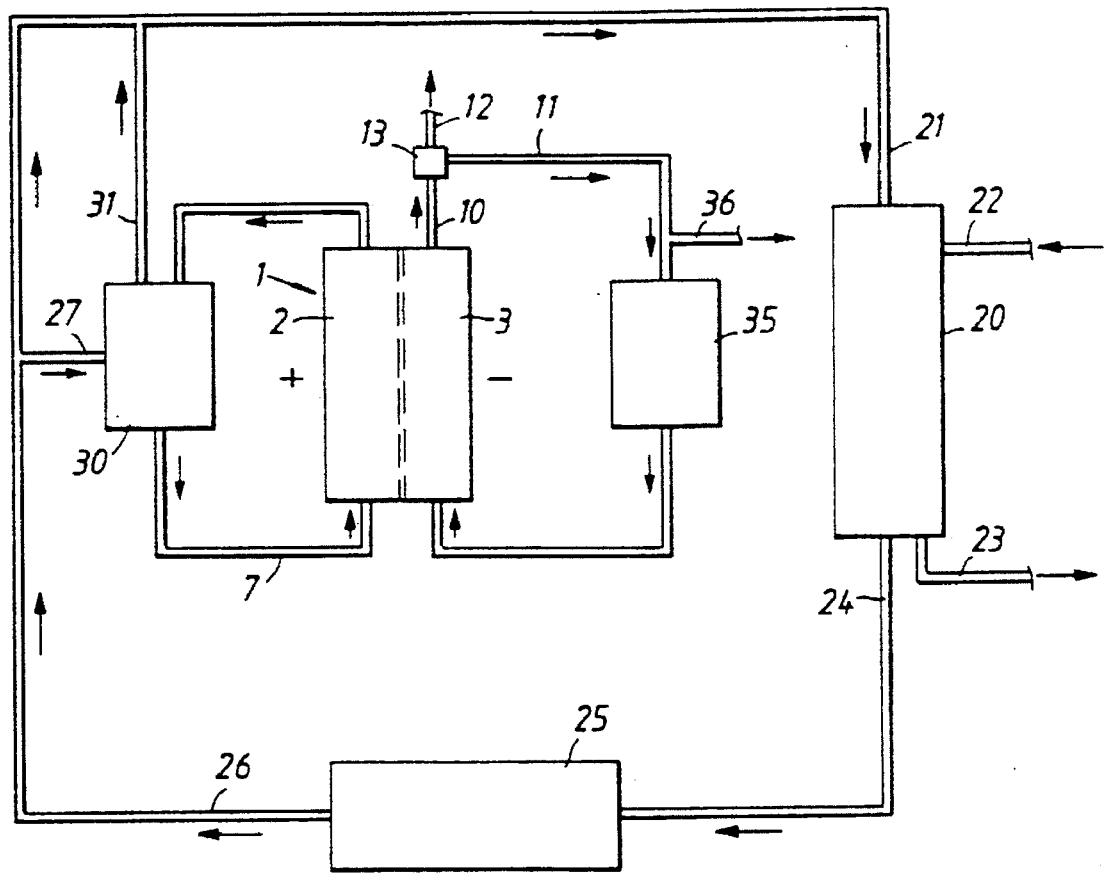

PRODUCTION OF POLYSULPHIDE BY ELECTROLYSIS OF WHITE LIQUOR CONTAINING SULPHIDE

This application is a 371 of a PCT SE94/00526 filed Jun. 1, 1994.

The present invention relates to a method for the electrolytic treatment of white liquor in a cell comprising separate anode and cathode compartments, sulphides present in the white liquor being oxidised in the anode compartment, and alkali being produced in the cathode compartment. The invention further concerns a method for manufacturing cellulose pulp, as well as an electrolytic cell suited for the treatment of white liquor.

When manufacturing cellulose pulp by alkaline cooking, usually through the so-called sulphate process, white liquor is used as cooking liquor and is obtained by treating the black liquor which is residual product from the cooking. The chemical composition of the white liquor is of major importance for the cooking results.

The demand of the pulp mills for alkali was previously met by sodium hydroxide obtained in the electrolytic production of chlorine gas for bleaching purposes. However, chloroine-gas bleaching has more and more fallen into disuse and is nowadays not used at all in most pulp mills, so that the chlorine gas formed in chlorine-alkali electrolysis has come to be regarded as an undesirable by-product.

In "Some Ideas on Polysulfide Pulping" by E. Venemark, Svensk Papperstidning (Swedish Paper Journal), No. 5, 15 Mar. 1964, it is stated that the yield of wood from alkaline pulp cooking is improved if the white liquor contains polysulphides. Although mention is made of electrolytic oxidation of sulphides, it is evident that tests in that direction have failed.

Further, it is known that the polysulphide content of white liquor can be increased by air oxidation, which is described in, for example, G. C. Smith et al, Paper Trade Journ., 1 May 1975, "All It Takes Is Moxy: Mead Oxidation System Generates Polysulfide Liquor".

Also, Yu. A. Malkov et al, Chemical Abstracts 101(8): 56694, Khimiya in Tekhnol. Dreves, Tsellyulozy, L. 1983, pp 45–50, from Ref. Zh., Khim. 1984, Abstract No. 6T3006 describe electrolytic treatments of white liquor but do not touch upon the production of alkali.

Moreover, the prior art encompasses the absorption of hydrogen sulphide from flue gases and the conversion thereof to sulphide, which is electrochemically oxidised in order to recover sulphur. This is described in, for example, A. A. Anani et al, J. Electrochem. Soc., Vol. 137, No. 9, September 1990, pp 2703–2709, "Electrochemical Production of Hydrogen and Sulfur by Low-Temperature Decomposition of Hydrogen Sulfide in an Aqueous Alkaline Solution"; Yen-Shiang Shih et al, Ind. Eng. Chem. Process Des. Dev., 1968, 25, pp 834–836, "Continuous Solvent Extraction of Sulfur from the Electrochemical Oxidation of a Basic Sulfide Solution in the CSTER System"; B. Dandapani et al, Intersociety Energy Conversion Engineering Conference 1986, pp 262–265, "Electrolysis of Hydrogen Sulfide in Aqueous Alkaline Solutions"; as well as U.S. Pat. No. 3,409,520. A common problem is the passivation of the anodes due to the precipitation of sulphur.

U.S. Pat. No. 4,717,450 describes how chloride is removed from spent liquor by electrolysis.

The present invention aims at providing a solution to the problem of how to produce alkali metal hydroxide from raw material normally accessible in pulp mills without the formation of any undesirable by-products. Also, the invention enables the improvement of processes commonly used for alkaline cooking of cellulose pulp.

Thus, the invention relates to a method for treating sulphide-containing white liquor, as set forth in the appended claims. According to the invention, the white liquor is treated in a continuously operating electrolytic cell having separate anode and cathode compartments, which are separated by a partially permeable barrier. White liquor is introduced into the anode compartment of the cell, and an aqueous solution of alkali metal hydroxide is introduced into the cathode compartment of the cell. In the anode compartment, sulphide is oxidised, while at the same time alkali metal cations are transported through the barrier into the cathode compartment in which water reacts to form hydroxide ions.

By white liquor is meant the liquid used in alkaline cooking of cellulose pulp, for instance sulphate pulp or kraft pulp, and obtained by the recovery of black liquor formed in the pulp cooking. Prior to the electrolytic treatment, the white liquor normally contains from about 2 mol/l to about 6 mol/l of alkali metal cations, of which from about 90% to about 97% is sodium, the remainder essentially consisting of potassium; from about 2 mol/l to about 4 mol/l of hydroxide; and from about 0.2 mol/l to about 1.5 mol/l of sulphide, mainly in the form of HS-. In addition, the white liquor usually contains sulphate, thiosulphate, chloride, as well as various impurities, such as silicon, aluminium, phosphorus, magnesium, copper, manganese and iron.

Preferably, the anode potential is so maintained that the oxidation product substantially consists of polysulphides, i.e. $S_2^{2-}$, $S_3^{2-}$, $S_4^{2-}$ and $S_5^{2-}$, and so forth. The exact limits of the anode potential depend on the magnitude of the over voltage. Normally, however, the anode potential is suitably maintained in a range of from about −0.6 V, which is the theoretical lower limit enabling the formation of polysulphide, to the level at which oxygen begins to develop, normally at about +0.6 V. Preferably, the anode potential is maintained in a range of from about −0.6 V to about +0.5 V, in particular in a range of from about −0.2 V to about +0.4 V.

The cathode potential is preferably so maintained that, apart from hydroxide ions, mainly hydrogen gas is formed, which in practice normally takes place in a range of from about −0.9 V to about −1.2 V. The hydrogen gas formed can be used as an environment-friendly source of energy or as raw material in other chemical processes. In another mode of operation, the cathode potential is maintained in a range of from about +0.3 V to about −0.9 V, while at the same time oxygen-containing gas, for example, air, is supplied to a cathode in the form of a gas-diffusion electrode, resulting in the reduction of oxygen and the formation of hydrogen peroxide and/or hydroxide ions. In the presence of oxygen, it is also possible to have the cell operate as a fuel cell, resulting in the generation of electric power.

All figures indicating electrode potentials, anode as well as cathode potentials, represent the potentials measured against a reference electrode of Hg/HgO in 1M NaOH at 25° C. The limits cannot be set at exact values, since the result at a certain potential depends on the magnitude of the over voltage in each particular case.

The white liquor introduced into the anode compartment may not have been treated at all or be recycled, or both. The recycled white liquor, if any, may contain from about 0.2 mol to about 1.5 mol of sulphide per liter, preferably from about 1 mol to about 1.5 mol of sulphide per liter. For instance, the conversion of sulphides may be from about 0.5% to 100%. Preferably, the solution introduced into the cathode compartment essentially consists of water and alkali metal hydroxide, especially hydroxide of sodium, potassium or mixtures thereof. The concentration of alkali metal hydroxide is not critical, and may, for example, be from about 1 mol/l to about 15 mol/l, preferably from about 5 mol/l to about 10 mol/l. The upper limit for what is regarded as suitable is generally determined by the properties of the barrier separating the anode and cathode compartments, since too much leakage of hydroxide ions through the barrier reduces the current efficiency.

In order to fully use the electrolytic cell, the process is preferably carried out at a current density exceeding about 0.5 kA/m$^2$, in particular exceeding about 2 kA/m$^2$. At excessive current densities, the anode is increasingly worn, and the risk of undesirable by-products, such as sulphate, thiosulphate and oxygen, is increased. Normally, a current density not exceeding about 20 kA/m$^2$, in particular not exceeding about 15 kA/m$^2$, is preferred. The formation of by-products is reduced even if the temperature of the anode compartment is sufficiently high, suitably in a range of from about 60° C. to boiling point, which usually is about 110°–120° C. In practice, the upper temperature limit depends on the material of the cell, especially when the barrier is made of a polymer-based membrane, for which reason the especially preferred temperature ranges from about 80° C. to about 100° C. For practical reasons, the temperature of the cathode compartment should be substantially equal to that of the anode compartment. Also, it has been found that the amount of by-products is reduced if the anolyte flow is sufficiently high. Preferably, the flow in the anode compartment is turbulent, and suitably the average linear velocity is higher than about 0.5 m/s. The catholyte flow is not critical and is, in actual practice, conveniently determined by the size of the lifting force of the generated gas. Otherwise, pumps may be used.

It has been found that the precipitation of sulphur on the anode can be avoided by the choice of a suitable material. Without preference to any specific theory, it is assumed that the oxidation of sulphide involves an intermediary stage in which atomic sulphur is bound to the anode surface. If this bond is too strong, the sulphur will not react further, and some of the sulphur will remain on the anode surface and there form a passivating surface layer. According to the invention, use is advantageously made of an anode which is made of a carrier material of high alkali resistance, such as titanium, zirconium, hafnium, niobium and alloys thereof, or carbon, nickel or nickel alloys, the carrier material being surface-coated with one or more oxides of ruthenium, iridium, platinum and palladium. Electrodes made of suitable material and having a suitable surface coating are commercially available, such as the so-called DSA® electrodes (dimensionally stable anode). It has been found that DSA® electrodes designed for oxygen or chlorine-gas generation are suited for use in the invention, such as those electrodes marketed under the designations ON 201, ON 120 and ON 101.

It is important that the anode has a large surface and that the sulphide transport to the entire surface functions well. Thus, the anode employed suitably is a three-dimensional through-flow electrode, such as a three-dimensional mesh electrode, balls of wire, layers of wire mats, particle beds or metal foam. It is especially preferred to use a three-dimensional mesh electrode composed of a plurality of layers of expanded metal, for example interconnected by spot welding.

The cathode material is not critical, and use can be made of such common alkali-resistant materials as steel, stainless steel, nickel and ruthenium-coated nickel. The cathode may consist of a flat plate, one or more layers of mesh, or a three-dimensional through-flow electrode similar to that used as anode. If oxygen-containing gas is to be blown into the cathode compartment, use should be made of an oxygen-reducing cathode, in which case a graphite-felt electrode is convenient. Such electrodes are commercially available and generally used, for example in fuel cells. The oxygen-reducing cathode may be coated with a catalyst, such as platinum, in order to increase the amount of hydroxide ions formed in relation to the amount of hydrogen peroxide. By oxygen-reduction, it is possible to produce an alkaline hydrogen peroxide solution which can be used as such for bleaching cellulose pulp. Also, the presence of hydrogen peroxide in the cathode compartment contributes to the resulting product being perfectly sulphide-free, since any sulphides leaking in from the anode compartment are at once oxidised by the peroxide to sulphate.

Preferably, use is made of a two-compartment cell with adjoining anode and cathode compartments, but cells having three or more compartments may also be used, in which case the white liquor may be introduced into the anode compartment as well as into one or more compartments located between the anode compartment and the cathode compartment. The barrier separating the compartments of the cell, normally found between the anode compartment and the cathode compartment, should let alkali metal cations from the anode compartment through to the cathode compartment, but should preferably to the greatest possible extent prevent the passage of sulphides and polysulphides and preferably that of other anions as well. Also hydroxide ions should preferably be prevented by the barrier, even if some may be permitted to pass. Preferably, use is made of a cation-selective membrane permeable to alkali metal cations but essentially impermeable to sulphides and polysulphides. If the cell has more than two compartments, different combinations of anion-selective and cation-selective membranes may be used for separating the different compartments of the cell. Furthermore, one or more porous diaphragm may be used as barriers, optionally in combination with one or more ion-selective membranes. Suitably membranes may, for instance, be made of perfluorinated, sulphonated or teflon-based polymers, or ceramics. Also polystyrene-based membranes or diaphragm of polymers or ceramics may be used. There are several commercially available membranes suitable for use, such as Nafion®.

A plurality of electrolytic cells can be arranged in bipolar as well as monopolar fashion.

The invention further concerns a method for manufacturing cellulose pulp by alkaline cooking, preferably through the sulphate process, in which case at least some of the white liquor is electrolytically treated as described above before being supplied to the cooking process.

In a preferred mode of operation, the white liquor is so treated that its content of polysulphides is increased before it is supplied to the cooking process. Then, the whole amount of white liquor can be treated at a low degree of conversion, for example ranging from about 0.5% to about 1%, based on the sulphide present in the white liquor, or a part flow can be treated at a higher degree of conversion, for example ranging from about 10% to 100%, preferably ranging from about 60% to about 95%, based on the sulphide present in the white liquor. Thereafter, the part flow can be mixed with the main flow, or be supplied locally in the pulp digester. In all the variants mentioned above, the catholyte is conveniently recycled in a special circuit, a steady state being maintained by recovering a part flow as a product, which, for example, can be used in the cooking process or the bleaching process or be completely removed from the system of the pulp mill.

In another mode of operation, a part flow of the white liquor is so treated that a large amount of the sulphides are converted to polysulphides, preferably about 70–100%, whereupon the polysulphides are converted to sulphur or some solid sulphur compound, for example by cooling crystallisation, and are removed from the system. This mode of operation is suited for use in mills where excessive amounts of sulphur compounds are supplied to the process along with the raw material. The catholyte may be treated as in the mode of operation described above.

In yet another mode of operation, a part flow of the white liquor is so treated that the sulphides are oxidised to sulphate. If so, the anolyte may be used as sulphide-free liquor of a certain sulphate content. The catholyte may be treated as in the modes of operation described above.

Moreover, the invention relates to an electrolytic cell suited for the treatment of white liquor as above, the electrolytic cell comprising an anode arranged in an anode compartment, a cathode arranged in a cathode compartment, and a barrier separating the anode and cathode compartments from one another, the anode consisting of a three-dimensional through-flow electrode which is made of a carrier material having high alkali resistance, such as titanium, zirconium, hafnium, niobium and alloys thereof, or carbon, nickel or nickel alloys, and being surface-coated with one or more oxides of ruthenium, iridium, platinum and palladium. Preferably, the anode is a three-dimensional mesh electrode composed of a plurality of layers of expanded metal. For more information, reference is made to the description of the inventive method.

The present invention enables energy-saving production of alkali on the basis of raw material available in pulp mills, without the formation of any undesirable by-products. Thus, it is, in some cases, possible to meet the demand for alkali of an entire pulp mill and at the same time obtain a surplus. Since both the anolyte and the catholyte are alkaline, the invention enables the production of highly concentrated alkali metal hydroxide, for instance up to about 15 mol/l, the upper limit generally depending on the membrane which separates the anode and cathode compartments. The risk of impurities impairing the function of the membrane is relatively small, and simple and inexpensive membranes may be used, since the anolyte is alkaline and the anode potential is comparatively low. The yield of wood in the manufacture of pulp can be augmented by increasing the polysulphide content of the white liquor. If the alkali metal hydroxide produced is not utilised in the closed part of the pulp process, it is also possible to reduce the risk of potassium concentration, thus avoiding the problems that may arise in the soda recovery unit at excessive potassium contents. The polysulphide-concentrated white liquor may also be used for scrubbing nasty-smelling gases, so-called blow gases from the pulp process, resulting in a good cleaning effect with respect to different mercaptans.

The invention will be described in more detail below with reference to the accompanying drawings.

BRIEF DESCRIPTION OF THE DRAWINGS

FIG. 3 is a schematic flow chart illustrating how the invention is applied to the manufacture of cellulose pulp.

Naturally, the invention is not restricted to the embodiments shown, but is defined by the scope of the appended claims.

Figure 1:
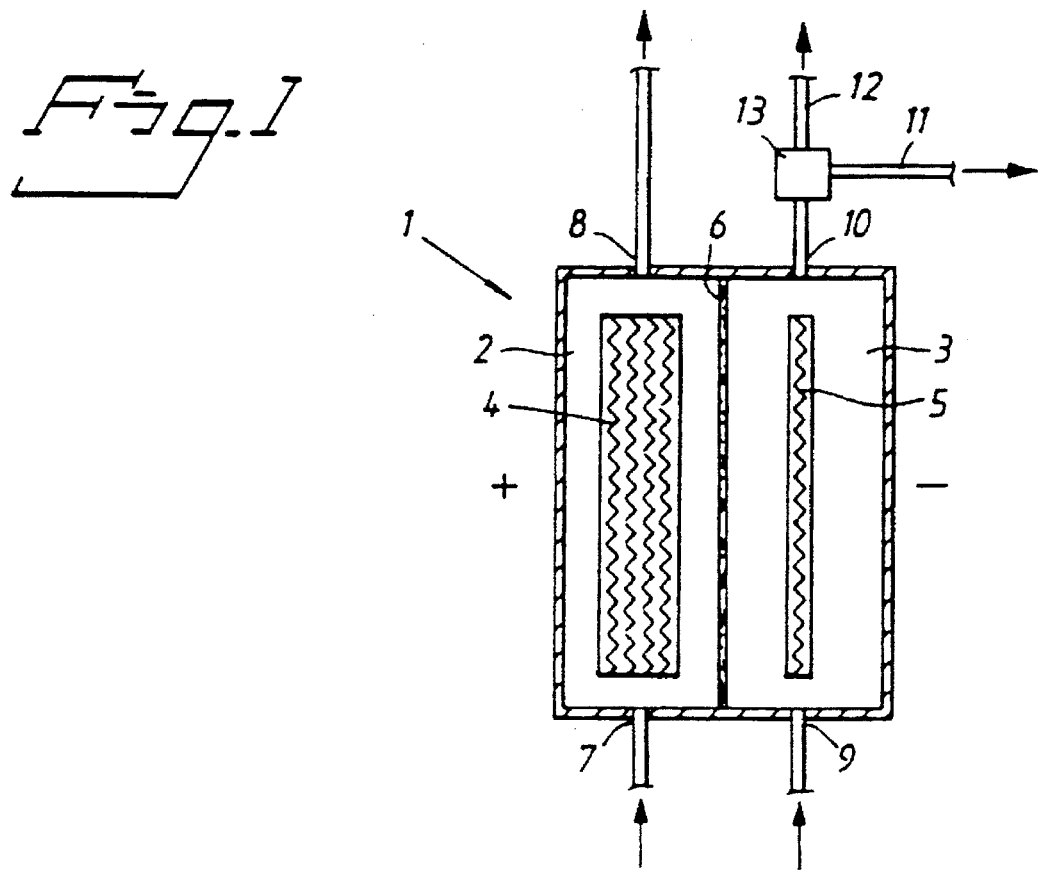
FIG. 1 is a schematic view of an electrolytic cell.

The electrolytic cell 1 illustrated in FIG. 1, comprises an anode compartment 2 provided with a three-dimensional through-flow electrode serving as an anode 4. A cathode compartment 3 provided with a three-dimensional cathode 5 is separated from the anode compartment 2 by means of a cation-selective membrane 6. The anode 4 and the cathode 5 are connected to a direct-current source (not shown). The anode compartment 2 has an inlet 7 and an outlet 8 for the anolyte. The cathode compartment 3 has an inlet 9 and an outlet 10 for the catholyte and gaseous products, extending to a gas separator 13 which has an outlet 12 for gas and an outlet 11 for liquid. When the cell 1 is in operation, white liquor is introduced into the anode compartment 2 through the inlet 7. Thus, sulphides are oxidised to polysulphides, and alkali metal cations are transported through the membrane 6 into the cathode compartment 3. Polysulphide-concentrated white liquor is discharged through the outlet 8. An aqueous solution of alkali metal hydroxide is introduced into the cathode compartment 3 through the inlet 9, and water is decomposed into hydrogen gas and hydroxide ions. The hydrogen gas is, along with an aqueous solution concentrated with respect to alkali metal hydroxide, discharged through the outlet 10. In the gas separator 13, the hydrogen gas 12 is separated from the alkali metal hydroxide 11.

Figure 2A:
FIGS. 2a and 2b are views of a three-dimensional mesh electrode.
Figure 2B:
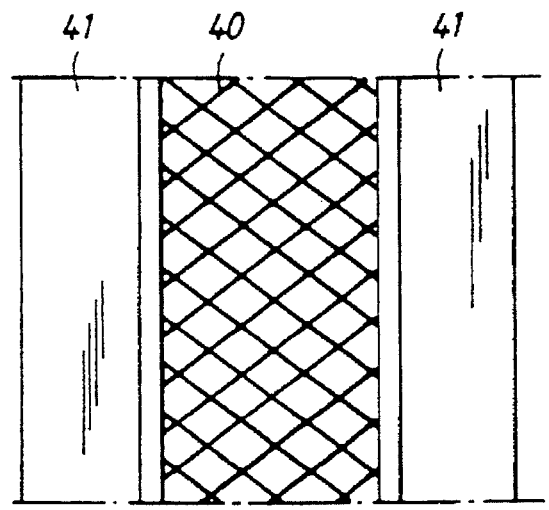

FIGS. 2a and 2b illustrate a three-dimensional mesh electrode from above and from the front, respectively. The illustrated electrode is composed of four nettings of expanded metal 40 which, by spot welding, are connected to a current supply in the form of metal strips 41.

FIG. 3 illustrates how an electrolytic cell 1 of the type shown in FIG. 1 may be used for alkaline production of cellulose pulp, such as sulphate pulp. For reasons of clarity, only one cell 1 is shown, but it is obvious to those skilled in the art that any number of cells, for example from two to several hundreds, can be interconnected in parallel or in series. A preferred mode of operation will now be described. A digester 20 is supplied with white liquor 21, as well as wood and other chemicals 22 required, such as alkali metal hydroxide. Cooking and washing (not shown) result in pulp 23 and black liquor 24 undergoing different treatment stages in the chemical-recovery system 25 of the process. Usually, the treatment stages in the recovery system 25 include evaporation, addition of make-up chemicals, such as sodium sulphate, combustion, and limestone causticisation of the green liquor formed in combustion, these treatment stages being well-known to those skilled in the art of pulp manufacture. The recovery of chemicals yields white liquor 26 which normally contains from about 0.5 mol/l to about 1 mol/l of sulphides, from about 2.5 mol/l to about 3.3 mol/l of hydroxide ions, and from about 3.8 mol/l to about 4.5 mol/l of alkali metal cations, of which from about 90% to about 97% normally is sodium, the remainder essentially consisting of potassium. Some of the white liquor 27, for example from about 1% to about 30%, is conducted to a tank 30 holding polysulphide-containing white liquor. White liquor whose polysulphide-content increases in electrolysis, for example in such a manner that from about 65% to about 95% of the sulphide is converted to polysulphide, circulates between the tank 30 and the anode compartment 2 of the electrolytic cell 1. Polysulphide-rich white liquor 31 is drawn off from the tank 30 to be mixed with the main flow 21, such that the aimed-at polysulphide content is achieved, for example from about 0.5% by weight to about 1.5% by weight, whereupon the resulting mixture is supplied to the digester 20. Alternatively, the polysulphide-rich white liquor 31 may, instead of being mixed with the main flow 21, be conducted directly to the digester 20 to be locally injected at one or more sites. An alkali metal hydroxide solution, for instance containing from about 2 mol to about 15 mol of alkali metal hydroxide per liter, circulates between the cathode compartment 3 of the cell 1 and a tank 35 via the gas separator 13. Some of the alkali metal hydroxide solution 11 from the gas separator 13 is drawn off as a product 36 and may, for example, be used in the manufacture of pulp, or in completely different processes. Water is supplied to the tank 35, thereby to maintain the volume and the concentration essentially constant.

In a particular mode of operation, sulphur may be expelled from the system by carrying the sulphide oxidation to high contents of polysulphides in the tank 30, preferably to a conversion exceeding 70%, based on the sulphide in the white liquor. White liquor from the tank 30 may then be so treated that sulphur is precipitated, for example through cooling crystallisation. This can be brought about by circulating polysulphide-rich white liquor between the tank 30 and crystalliser (not shown) from which precipitated sulphur is removed, the mother liquor being recycled to the tank 30.

In another mode of operation, the sulphides in the white liquor are to a great extent oxidised to sulphate, which can be performed by filling the tank 30 with white liquor, which then is circulated through the anode compartment 2, no white liquor leaving the circulation system until essentially the entire amount of sulphides has been converted to sulphate or thiosulphate. The resulting sulphate-rich, substantially sulphide-free white liquor may then be used as a source of alkali in the pulp mill. In this mode of operation, the carbonate present in the white liquor leaves in the form of carbon dioxide, resulting in a net production of hydroxide solution in the catholyte.

The invention will now be further elucidated by means of two Examples.

EXAMPLE 1

Electrolysis of synthetic white liquor was performed in a flow cell, in which the anode and cathode compartments were separated by a cation-selective membrane (Nafion® 425). The anode used consisted of a three-dimensional electrode made up of three nettings of expanded metal of titanium coated with DSA ON 201, which were spot-welded in a frame of titanium. The cathode used consisted of a flat nickel electrode. The surface of the membrane, the surface of the cathode, and the cross-sectional area of the anode were 10 cm$^2$. However, the total anode surface was many times greater, owing to its three-dimensional structure. The anolyte consisted of 100 ml of synthetic white liquor, i.e. an aqueous solution of 3.0 mol/l NaOH, 0.7 mol/l $Na_2S$, and 0.25 mol/l $Na_2CO_3$. The catholyte consisted of 100 ml of an aqueous solution of 3 mol/l NaOH. The two solutions were each circulated by means of pumps between a thermostated reactor and the respective electrode compartments. Both solutions had a temperature of 90° C. The electrolysis was performed at a constant current load of 1.0 A. The cell voltage was measured by means of a high-impedance digital voltmeter and was corrected for the voltage drop in the electrolyte and the current connector (IR drop) by means of measuring equipment for current interrupt studies. The corrected cell voltage initially was 0.9 V and increased slowly to 1.1 V after two hours. After another two hours, no free sulphide content was detected, but the cell voltage remained below 1.2 V. The conversion was 90%, and the current efficiency for the polysulphide formed was about 70%, whereas the current efficiency for the hydroxide formed in the catholyte was about 50%.

EXAMPLE 2

This test was performed as in Example 1, but using technical white liquor as anolyte and having an anode coated with DSA® ON 101. To begin with, the sulphide content was 0.68 mol/l, and no polysulphide could be detected. The corrected cell voltage was below 1 V for the first three hours of the electrolysis. During that time, 98% of the sulphide was converted to polysulphide at a current efficiency of 65%. Then, the cell voltage increased to 2 V. After seven hours, both the sulphide and the polysulphide had been completely eliminated in the anolyte.

We claim:

1. A method for treating sulphide-containing white liquor, wherein the white liquor is treated in a continuously operating electrolytic cell having separate anode and cathode compartments separated by a partially permeable barrier, by introducing white liquor into the anode compartment of the cell and an aqueous solution of alkali metal hydroxide into the cathode compartment of the cell, oxidizing sulphide in the anode compartment, while at the same time alkali metal cations are transported through the barrier into the cathode compartment in which water reacts to form hydroxide ions, wherein the temperature in the anode compartment is maintained in a range of from about 60° C. to the boiling point of the white liquor.

2. A method as claimed in claim 1, wherein the anode potential is maintained such that the oxidation of sulphides in the white liquor essentially yields polysulphides.

3. A method as claimed in claim 1, wherein the anode potential is maintained in a range of from about −0.6 V to about +0.6 V, as measured against a reference electrode of Hg/HgO in 1M NaOH at 25° C.

4. A method as claimed in claim 1, wherein the anode employed is made of a carrier material which has high alkali resistance and is surface-coated with one or more oxides selected from the group consisting of ruthenium oxide, iridium oxide, platinum oxide and palladium oxide.

5. A method as claimed in claim 1, wherein a three-dimensional through-flow electrode is used as anode.

6. A method as claimed in claim 5, wherein a three-dimensional mesh electrode composed of a plurality of expanded-metal layers is used as anode.

7. A method as claimed in claim 1, wherein the electrolytic flow in the anode compartment is turbulent.

8. A method as claimed in claim 1, wherein a gas-diffusion electrode is used as cathode, and an oxygen-containing gas is supplied to the cathode.

9. A method as claimed in claim 1, wherein the temperature in the anode compartment is maintained in a range of from about 80° C. to about 100° C.

10. A method as claimed in claim 1, wherein a cation-selective membrane, which is permeable to alkali metal cations but essentially impermeable to sulphides and polysulphides, is used as said barrier between the anode compartment and the cathode compartment.

11. A method for manufacturing cellulose pulp by alkaline cooking using white liquor, wherein at least some of the white liquor is electrochemically treated in accordance with claim 1, before being supplied to the cooking process.

12. An electrolytic cell suited for the treatment of white liquor in accordance with claim 1, comprising an anode arranged in an anode compartment, a cathode arranged in a cathode compartment, and a barrier separating the anode and cathode compartments from one another, the anode consisting of a three-dimensional through-flow electrode composed of a plurality of expanded-metal layers of a carrier material which has high alkali resistance and is surface-coated with one or more oxides selected from the group consisting of ruthenium oxide, iridium oxide, platinum oxide and palladium oxide.

13. A method as claimed in claim 1, wherein the temperature of the white liquor in the anode compartment exceeds about 60° C.

* * * * *